(12) United States Patent
Benhase et al.

(10) Patent No.: US 9,158,471 B2
(45) Date of Patent: *Oct. 13, 2015

(54) REPLICATING TRACKS FROM A FIRST STORAGE SITE TO A SECOND AND THIRD STORAGE SITES

(71) Applicant: International Business Machines Corporation, Armonk, NY (US)

(72) Inventors: Michael T. Benhase, Tucson, AZ (US); Lokesh M. Gupta, Tucson, AZ (US); Brian D. Hatfield, Tucson, AZ (US); Gail A. Spear, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/073,877

(22) Filed: Nov. 7, 2013

(65) Prior Publication Data

US 2014/0075114 A1    Mar. 13, 2014

Related U.S. Application Data

(63) Continuation of application No. 13/612,314, filed on Sep. 12, 2012.

(51) Int. Cl.
*G06F 12/00* (2006.01)
*G06F 3/06* (2006.01)
*G06F 12/12* (2006.01)
*G06F 12/08* (2006.01)

(52) U.S. Cl.
CPC .............. *G06F 3/065* (2013.01); *G06F 3/067* (2013.01); *G06F 3/0619* (2013.01); *G06F 3/0689* (2013.01); *G06F 12/12* (2013.01); *G06F 12/0866* (2013.01); *G06F 12/0868* (2013.01)

(58) Field of Classification Search
CPC .......................... G06F 12/0866; G06F 12/0868
See application file for complete search history.

(56) References Cited

U.S. PATENT DOCUMENTS

| | | | |
|---|---|---|---|
| 6,381,677 | B1 | 4/2002 | Beardsley et al. |
| 7,409,510 | B2 | 8/2008 | Werner et al. |
| 2005/0251634 | A1 | 11/2005 | Burton et al. |
| 2008/0098187 | A1 | 4/2008 | Ashour et al. |
| 2012/0079224 | A1 | 3/2012 | Clayton et al. |
| 2012/0198150 | A1 | 8/2012 | Benhase et al. |
| 2012/0303861 | A1 | 11/2012 | Benhase et al. |

OTHER PUBLICATIONS

U.S. Appl. No. 13/612,314, filed Sep. 12, 2012.
(Continued)

*Primary Examiner* — Cheng-Yuan Tseng
*Assistant Examiner* — Arvind Talukdar
(74) *Attorney, Agent, or Firm* — David W. Victor; Konrad Raynes Davda & Victor LLP

(57) ABSTRACT

Provided are a computer program product, system, and method for replicating tracks from a first storage to a second and third storages. A determination is made of a track in the first storage to transfer to the second storage as part of a point-in-time copy relationship and of a stride of tracks including the target track. The stride of tracks including the target track is staged from the first storage to a cache according to the point-in-time copy relationship. The staged stride is destaged from the cache to the second storage. The stride in the cache is transferred to the third storage as part of a mirror copy relationship. The stride of tracks in the cache is demoted in response to destaging the stride of the tracks in the cache to the second storage and transferring the stride of tracks in the cache to the third storage.

9 Claims, 6 Drawing Sheets

(56) References Cited

OTHER PUBLICATIONS

Office Action dated Oct. 2, 2014, pp. 26, for U.S. Appl. No. 13/612,314, filed Sep. 12, 2012.
Amendment dated Jun. 11, 2015, pp. 9, for U.S. Appl. No. 13/612,314, filed Sep. 12, 2012.
Notice of Allowance dated Jul. 2, 2015, pp. 9, for U.S. Appl. No. 13/612,314, filed Sep. 12, 2012.
U.S. Appl. No. 14/738,821, filed Jun. 12, 2015.
Preliminary Remarks dated Jun. 12, 2015, pp. 11, for U.S. Appl. No. 14/738,821, filed Jun. 12, 2015.

ing tracks in the first storage $4a$ sub-
ject to being copied as part of a PiT copy to identified corre-
sponding tracks in the second storage $4b$. The PiT copy rela-
tionship $16$ further includes a PiT bitmap $18$ indicating tracks# REPLICATING TRACKS FROM A FIRST STORAGE SITE TO A SECOND AND THIRD STORAGE SITES

CROSS-REFERENCE TO RELATED APPLICATION

This application is a continuation of U.S. patent application Ser. No. 13/612,314, filed Sep. 12, 2012, which application is incorporated herein by reference in its entirety.

BACKGROUND OF THE INVENTION

1. Field of the Invention

The present invention relates to a computer program product, system, and method for replicating tracks from a first storage to a second and third storages.

2. Description of the Related Art

In a storage environment, volumes may be mirrored to other volumes to provide redundant copies of data. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data. Point-in-time copy techniques, such as the IBM FlashCopy® (FlashCopy is a registered trademark of International Business Machines, Corp. or "IBM"), defer the transfer of data back to the copy volume until a write operation is requested to that data block on the source volume. The FlashCopy operation may specify a background copy operation to copy tracks subject to the Flash-Copy relation in the background before a write is received. Until the actual copy operation occurs, reads are directed to the data blocks on the source volume. The point-in-time copy relationships that are immediately established in response to the point-in-time copy command include a bitmap or other data structure indicating the location of blocks in the volume at either the source volume or the copy volume.

The FlashCopy relationship may also be configured with no background copy, so that tracks are only copied before a write is applied to the track. In this configuration, when a track is destaged on the source, the previous version of the source on the disk may need to be copied to the target before the destage is allowed on the source. This is done using a CST (Copy Source to Target) operation. CST will stage the track from the source disk and then synthesize the target track in the target cache and then destage the track to the target storage. Once the destage on the target is complete, the track is demoted from cache in an accelerated fashion.

In further configurations, the FlashCopy target may also comprise a primary storage in a mirror Peer-to-Peer Copy (PPRC) relationship. In such a case, the track in the PPRC primary, which is also the FlashCopy target, may need to be transferred to the PPRC secondary storage in a PPRC remote site.

There is a need in the art for improved techniques for managing the replication of a track in a first storage to multiple replication storages.

SUMMARY

Provided are a computer program product, system, and method for replicating tracks from a first storage to a second and third storages. A point-in-time copy relationship is provided to copy tracks as of a point-in-time in the first storage to a second storage. A mirror copy relationship is provided to copy data in the second storage to the third storage. A determination is made of a track in the first storage to transfer to the second storage as part of the point-in-time copy relationship and of a stride of tracks including the target track. The stride of tracks including the target track is staged from the first storage to a cache according to the point-in-time copy relationship. The staged stride is destaged from the cache to the second storage. The stride in the cache is transferred to the third storage as part of the mirror copy relationship. The stride of tracks in the cache is demoted in response to destaging the stride of the tracks in the cache to the second storage and transferring the stride of tracks in the cache to the third storage.

DETAILED DESCRIPTION

Figure 1:
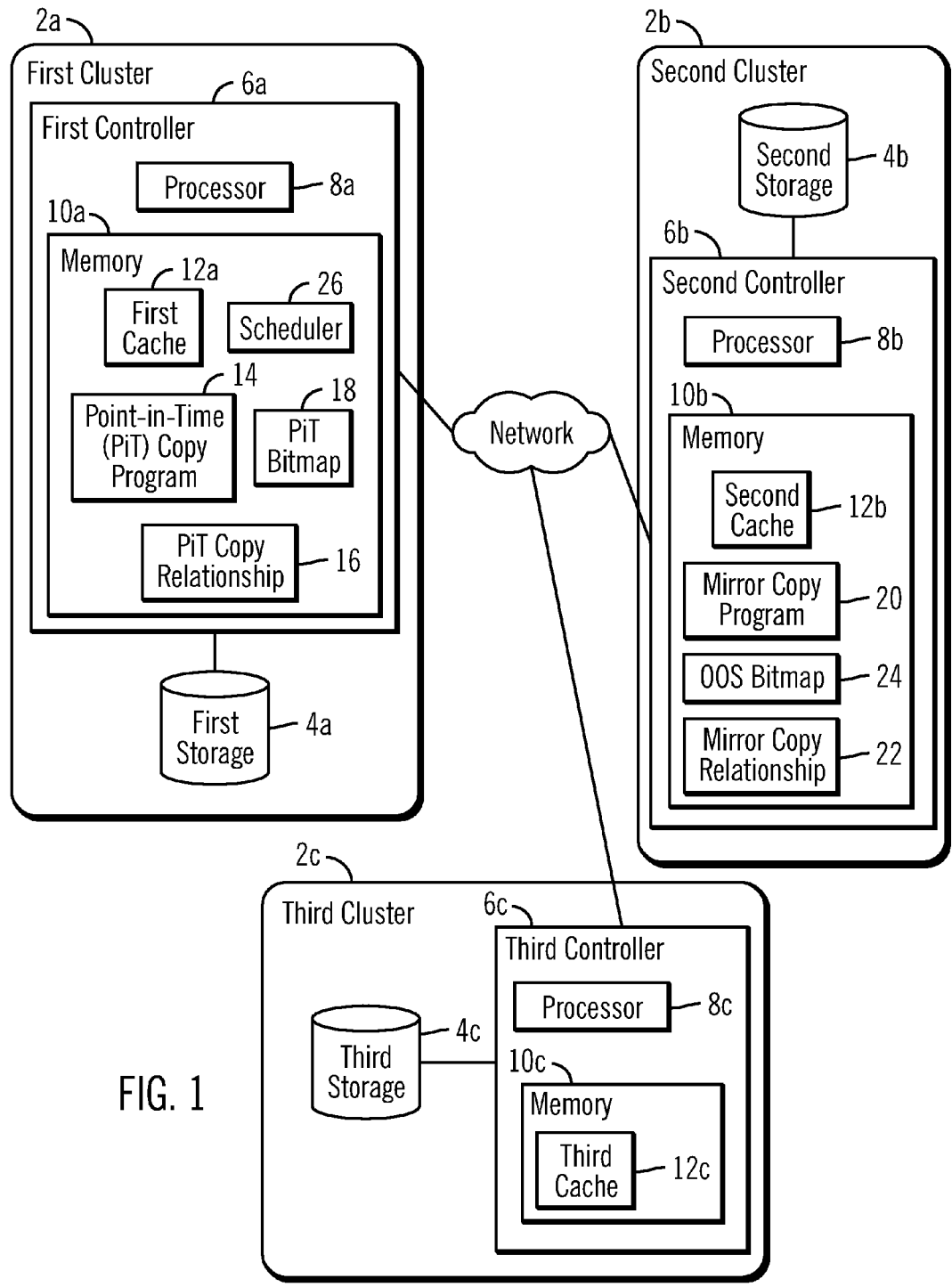
FIG. 1 illustrates an embodiment of a storage replication environment.

FIG. 1 illustrates an embodiment of a data replication environment having a first cluster $2a$, a second cluster $2a$, and third cluster $2c$, where data maintained in a first storage $4a$ in the first cluster $2a$ may be replicated to a second storage $4b$ and a third storage $4c$ in the second $2b$ and third $2c$ clusters, respectively. The clusters $2a$, $2b$, $2c$ further include first $6a$, second $6b$, and third $6c$ controllers, respectively, to manage Input/Output (I/O) access to the corresponding storage $4a$, $4b$, $4c$. The clusters $2a$, $2b$, $2c$ may be in a same physical or geographical location and/or in different geographical locations. Further, the clusters $2a$, $2b$, $2c$ may be implemented in a same computer node or different computer nodes.

The controllers $6a$, $6b$, $6c$ include processors $8a$, $8b$, $8c$ and memories $10a$, $10b$, $10c$, respectively. The controllers $6a$, $6b$, $6c$ further have caches $12a$, $12b$, $12c$, respectively, to cache data subject to read and write requests directed to the storages $4a$, $4b$, $4c$. Hosts (not shown) may direct read and write requests to the first controller $6a$ to access tracks in the first storage $4a$. A host write to a track in the first storage $4a$ in a point-in-time ("PiT") copy relationship $16$ may result in the replication of that track to the second $2b$ and the third $2c$ clusters if the track is also part of a mirror copy relationship $22$. The controllers $6a$, $6b$, $6c$ may communicate over a network $9$.

The first memory $10a$ includes a point-in-time (PiT) copy program $14$ to maintain a point-in-time copy of data by copying-on-write data in the first storage $4a$ before the data is updated. The PiT copy program $14a$ may implement a PiT program such as IBM FlashCopy, snapshot, and other PiT programs. The PiT copy program $14$ maintains a PiT copy relationship $16$ identifying tracks in the first storage $4a$ sub-ject to being copied as part of a PiT copy to identified corresponding tracks in the second storage $4b$. The PiT copy relationship $16$ further includes a PiT bitmap $18$ indicating tracks in the first storage 4a that have been copied to the second storage 4b, so that the data as of the point-in-time comprises the data in the first storage 4a and the PiT tracks copied to the second storage 4b before being updated. The PiT copy relationship 16 may be configured with a background copy operation to copy all tracks in the first storage 4a to the second storage 4b in the background. When a track is copied as part of the background operation, the bit for that copied track in the PiT bitmap 18 is updated to indicate that the track as of the point-in-time resides in the second storage 4b.

The second controller 6b maintains a mirror copy program 20 to create a mirror copy of tracks in the second storage 4b to the third storage 4c. The mirror copy program 20 may comprise mirror copy programs known in the art, such as the IBM Peer-to-Peer-Copy ("PPRC") program. The mirror copy program 20 copies tracks indicated in a mirror copy relationship 22 that specifies the tracks to mirror from the second storage 4b to the third storage 4c. An out-of-synch ("OOS") bitmap 24 includes a bit indicating each track in the mirror copy relationship 24, such that the bits are set to indicate copy at an initial point when all bits are sent to indicate copy to cause an initial copy of all the data to mirror and when a track is updated so that the updated track is copied to the third storage 4c.

A scheduler 26, shown as residing in the first controller 6a, but may alternatively reside in other controllers e.g., 6b, 6c, schedules the PiT copy program 14 and mirror copy program 20 to perform the copy operations specified in the PiT 16 and mirror 22 copy relationships, respectively. The scheduler 26 allocates tasks to perform the staging of the track from the first storage 4a to the second cache 12b to be destaged to the second storage 4b and to perform the mirror copy operation of the track staged into the second cache 12b to the third storage 4b.

The programs scheduler 26, PiT copy program 14, and mirror copy program 20 are shown in FIG. 1 as program code loaded into the memories 10a, 10b and executed by the processors 8a, 8b. Alternatively, some or all of the functions of these programs may be implemented in hardware devices in the controllers 6a, 6b, such as in Application Specific Integrated Circuits (ASICs), Field Programmable Gate Array (FPGA), etc.

The storages 4a, 4b, 4c may store tracks in a Redundant Array of Independent Disks (RAID) configuration where strides of tracks are written across multiple storage devices comprising the storages 4a, 4b, 4c. Strides comprise tracks written across disks in a RAID rank, where a stride of track includes data and parity information calculated form the data in the stride striped across the storage devices. A RAID rank comprises a group of storage devices configured to work as a RAID set, such that the stride of tracks, including data and parity tracks, are striped across the storage devices in the RAID rank. The storages 4a, 4b, 4c may include one or more configured RAID ranks The memories 10a, 10b, 10c may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The storages 4a, 4b, 4c may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 9 may comprise a network such as a Local Area Network (LAN), Storage Area Network (SAN), Wide Area Network (WAN), peer-to-peer network, wireless network, etc. Further the network 9 may be separated into separate networks between the controllers 6a, 6b, 6c.

Figure 2:
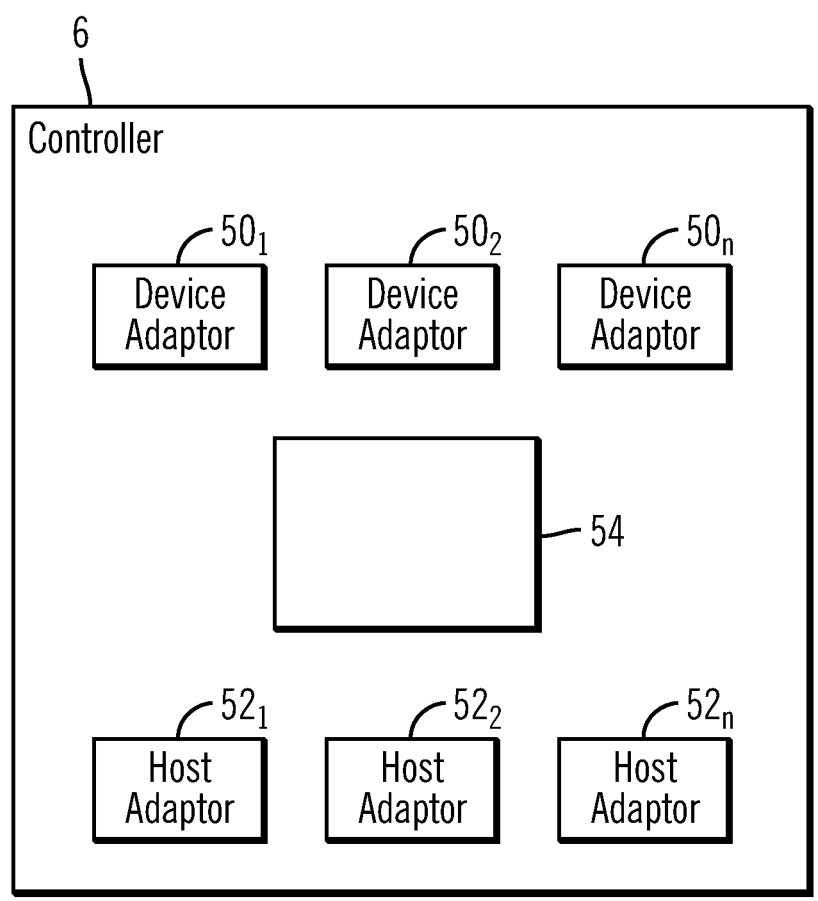
FIG. 2 illustrates an embodiment of a controller.

FIG. 2 illustrates further components of a controller 6, such as the controllers 6a, 6b, 6. The controller 6 includes a plurality of device adaptors $50_1, 50_2 \ldots 50_n$ to provide multiple ports to connect to storage devices in the storages 4a, 4b, 4c to perform read/write operations and a plurality of host adaptors $52_1, 52_2 \ldots 52_n$ to provide multiple ports to connect to the network 9. Element 54 represents the other components of the controllers 6a, 6b, 6c such as shown in FIG. 1. The variable "n" used with different elements, such as device adaptors and host adaptors, may indicate a same or different number for the different elements.

Figure 3:
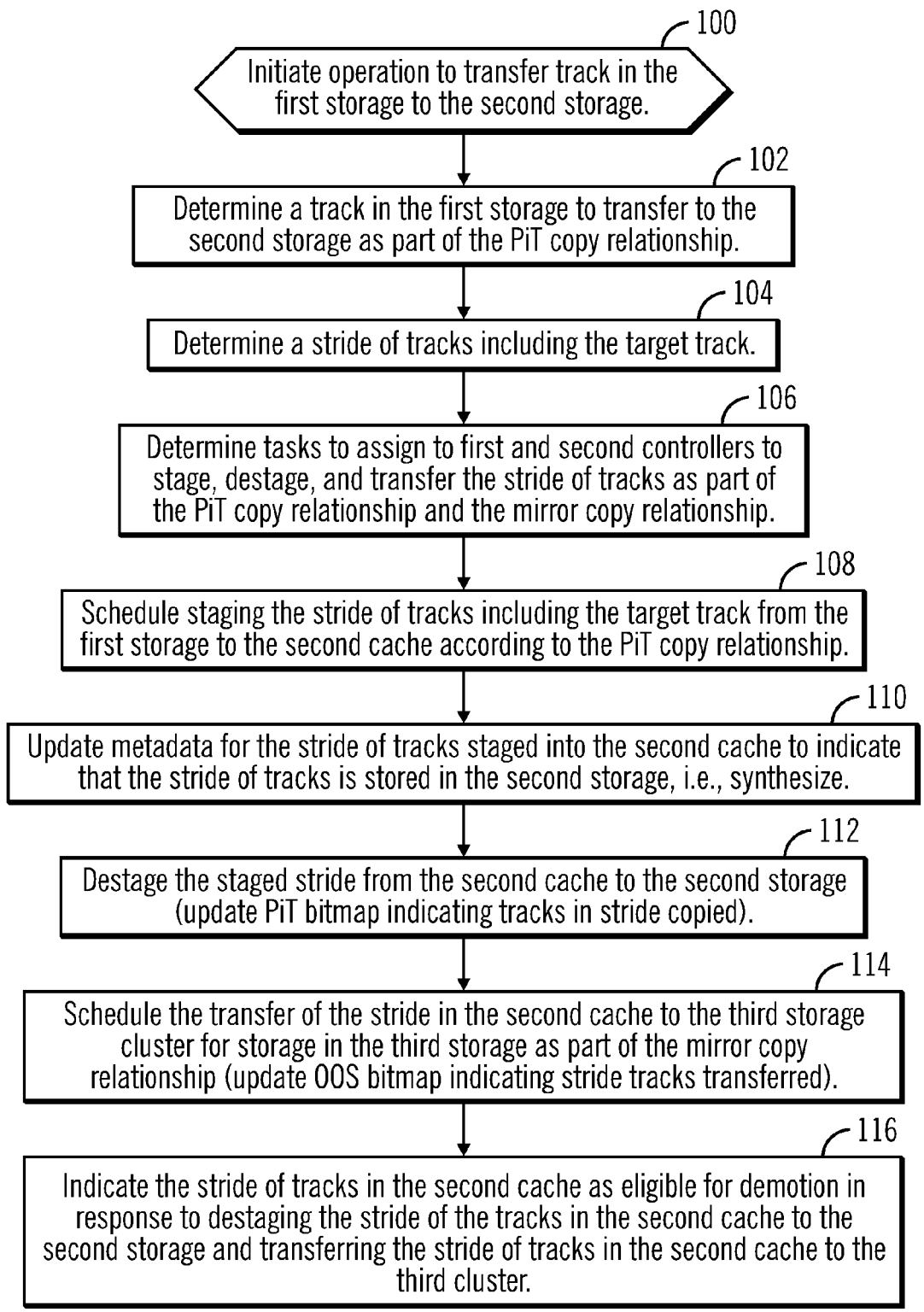
FIG. 3 illustrates an embodiment of operations to transfer a track from the first storage to the second storage.

FIG. 3 illustrates an embodiment of operations performed by the scheduler 26 and the copy components, such as the PiT copy program 14, mirror copy program 20, and controllers 6a, 6b, 6c, to replicate tracks among the sites 2a, 2b, 2c. Upon initiating (at block 100) an operation to transfer a track in the first storage 4a to the second storage 4b, the PiT copy program 14 determines (at block 102) a track in the first storage 4a to transfer to the second storage 4b as part of the PiT copy relationship 16. The determined track may be copied as part of a PiT background copy operation or as a copy-on-write operation to move the point-in-time track to the second storage 4b before being updated. The scheduler 26 or other components may then perform operations to schedule the PiT copy program 14 and mirror copy program 20 to perform the copy operations. The scheduler 26 determines (at block 104) a stride of tracks including the target track. The stride may include the determined track, the other tracks in the stride, and the parity data for the tracks in the stride that are striped to the RAID rank. The parity data may be calculated from the tracks in the stride.

The scheduler 26 determines (at block 106) tasks to assign to first and second controllers 6a, 6b to stage, destage, and transfer the stride of tracks as part of the PiT copy relationship and the mirror copy relationship. The scheduler 26 may assign tasks to ports on the second controller 6b host adaptors $52_1, 52_2 \ldots 52_n$ for the mirror copy operation, and assign tasks to the device adaptors $50_1, 50_2 \ldots 50_n$ in the first 6a and second 6b controllers, and assign tasks to access the RAID ranks in the first 4a and second 4b storages. The scheduler 26 schedules the PiT copy program 14 to stage (at block 108) the stride of tracks including the target track from the first storage 4a to the second cache 12b according to the PiT copy relationship 16. The second controller 6b updates (at block 110) metadata for the stride of tracks staged into the second cache 12, e.g., synthesis, to indicate that the stride of tracks is stored in the second storage 4b, such as change the track identifier, volume identifier, and storage device identifier to that in the second storage 4b where the track will be destaged. The second controller 6b destages (at block 112) the staged stride from the second cache 12b to the second storage 4b. The PiT bitmap 18 is updated to indicate the tracks that were copied to the second cache 12b.

The scheduler 26 further schedules (at block 114) the mirror copy program 20 to transfer the stride of tracks in the second cache 12b to the third cluster 2c for storage in the third storage 4c as part of the mirror copy relationship 20. Upon transferring the stride of tracks to the third cluster 3c, the OOS bitmap 24 is updated to indicate the tracks that were transferred. In response to destaging the stride of the tracks in the second cache 12b to the second storage 4b and transferring the stride of tracks in the second cache 12b to the third cluster 2c, the stride of tracks are indicated (at block 116) as eligible for demotion, which means they may be demoted in an accelerated manner or demoted according to a Least Recently Used (LRU) cache management scheme.

With the operations of FIG. 3, a stride of tracks staged into the second cache 4b is destaged to the second storage 4b and transferred to the third cluster 2c before being demoted. In this way, the stride of tracks do not need to be staged in an additional time from the second storage 4b to mirror to the third cluster 2c because the stride of tracks remain in the second cache 12b and are not demoted until destaged to the second storage 4b as part of the PiT copy relationship 16 and mirrored to the third cluster 2c as part of the mirror copy relationship 20. Further, with certain of the described embodiments, one scheduler 26 schedules the PiT copy operation and the mirror copy operation to ensure that the stride of tracks staged once into the second cache 12b are transferred to the second storage 4b and the third storage 4c before being demoted to avoid having to re-stage the stride of tracks back into the second cache 12b. Yet further, with the described embodiments, the copying of an entire stride optimizes the writing to the second storage 4b rank and the mirror copy operation by performing a full stride write, tracks and parity data, to the second storage 4b and the third storage 4c.

Figure 4:
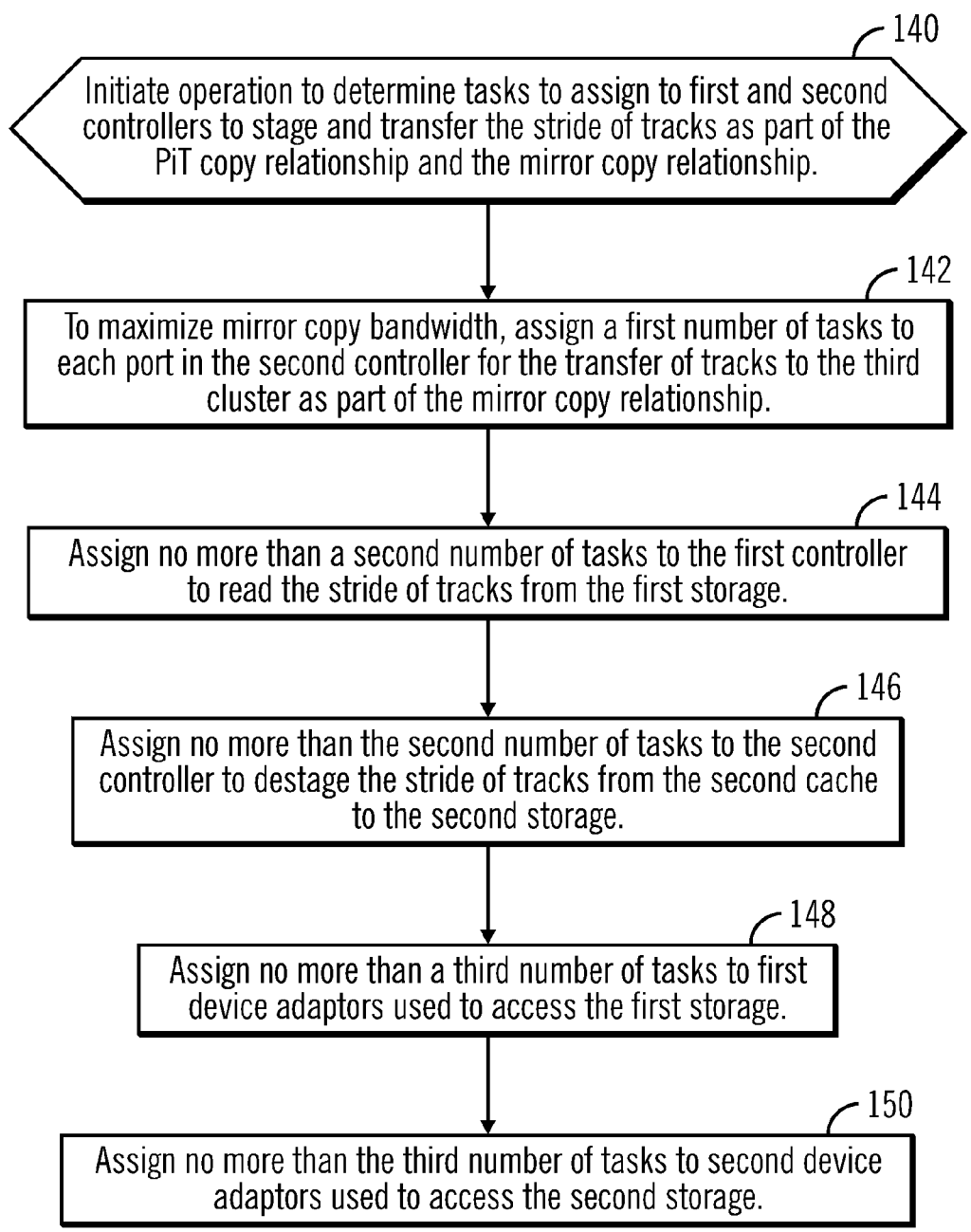
FIG. 4 illustrates an embodiment of operations to assign tasks to the copy operations.

FIG. 4 illustrates an embodiment of operations performed by the scheduler 26 to assign tasks in the first controller 6a and second controller 6b for the PiT copy and mirror copy operations. FIG. 4 may comprise the operations performed at block 106 in FIG. 3 to assign tasks. The scheduler 26 initiates (at block 140) an operation to assign tasks to the first 6a and second 6b controllers to stage and transfer the stride of tracks. To maximize mirror copy bandwidth for the mirror copy operation to copy the stride of tracks from the second cache 12b to the third storage 4c, the scheduler 26 assigns (at block 142) a first number of tasks, e.g., minimum number of tasks, to each port in the second controller 6b host adaptors $52_1$, $52_2 \ldots 52_n$, which are used to perform the mirror copy operation to the third storage 4c in the third cluster 2c. To avoid overdriving the ranks in the first 4a and second 4b storages, the scheduler 26 assigns (at block 144) no more than a second number of tasks, a maximum number, to the first controller 6a to read the stride of tracks from the first storage 4b to stage to the second cache 12b. The scheduler 26 further assigns (at block 146) no more than the second number of tasks to the RAID rank of the second controller 6b to destage the stride of tracks from the second cache to the second storage. The tasks assigned at blocks 144 and 146 are tasks to run on the RAID ranks in the first 4a and second 4b storages to transfer the data, such as tasks to manage queues and data structures to access the data in the RAID ranks in the first 4a and second 4b storages.

The scheduler 26 assigns (at block 148) no more than a third number of tasks, e.g., another maximum number, to each of the first device adaptors $50_1, 50_2 \ldots 50_n$ in the first controller 6a used to access the first storage 4a and assigns (at block 150) no more than the third number of tasks, e.g., another maximum number, to each of the second device adaptors $50_1, 50_2 \ldots 50_n$ in the second controller 6b used to access the second storage 4b. The third number of tasks is a maximum number that is used to avoid overdriving the device adaptors $50_1, 50_2 \ldots 50_n$. The tasks assigned to the first device adaptors $50_1, 50_2 \ldots 50_n$ are used by the first controller 6a to transfer the stride from the first storage 4a to the second cache 12b and the tasks assigned to the second device adaptors $50_1, 50_2 \ldots 50_n$ are used by the second controller 6b to destage the stride from the second cache 12b to the second storage 4b.

Figure 5:
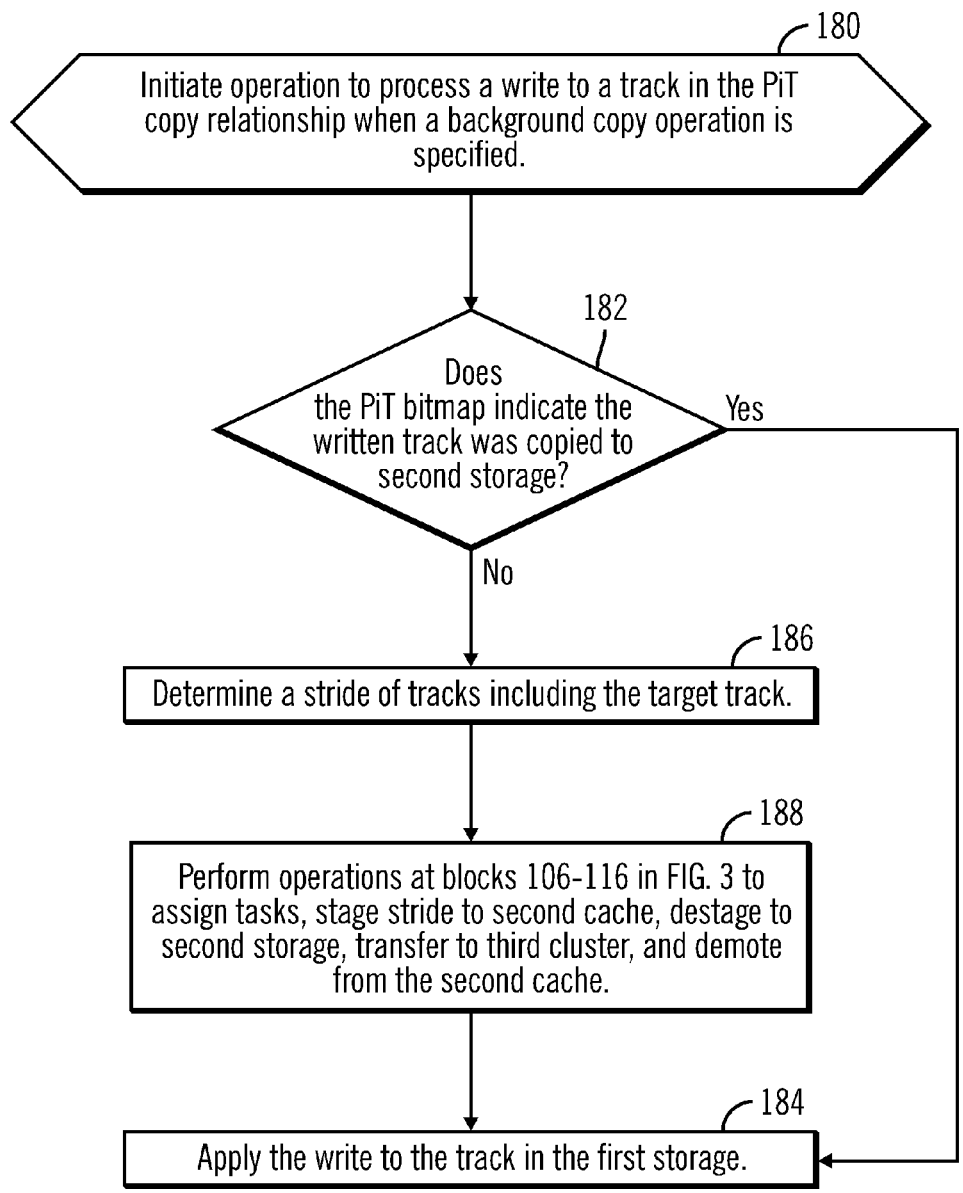
FIG. 5 illustrates an embodiment of operations to process a write to a track when a background copy operation is specified.

FIG. 5 illustrates an embodiment of operations performed by the scheduler 26 and the copy components, such as the PiT copy program 14, mirror copy program 20, and controllers 6a, 6b, 6c to replicate tracks among the sites 2a, 2b, 2c upon receiving a write to a track in a PiT copy relationship 16 with a background copy operation to copy the tracks in the PiT copy relationship 16 from the first storage 4a to the second storage 4b. Upon receiving the write, the PiT copy program 14 (or scheduler 26 or other component) determines whether the PiT bitmap 18 indicates that the track to write was already copied to the second storage 4b. If (from the yes branch of block 182) the track has already been copied, then the write is applied (at block 184) to the track in the first storage 4b. If (from the no branch of block 182) the track to update has not been copied to the second storage 4b, then the scheduler 26 (or other component) determines (at block 186) a stride of tracks including the target track and performs (at block 188) the operations at blocks 106-116 in FIG. 3 to assign tasks, stage the stride to the second cache 12b, destage to the second storage 4b, transfer to the third cluster 2c, and demote from the second cache 12b. Upon staging the stride of tracks to the second cache 12b, the write may be applied (at block 184) to the track in the first storage 4a.

Figure 6:
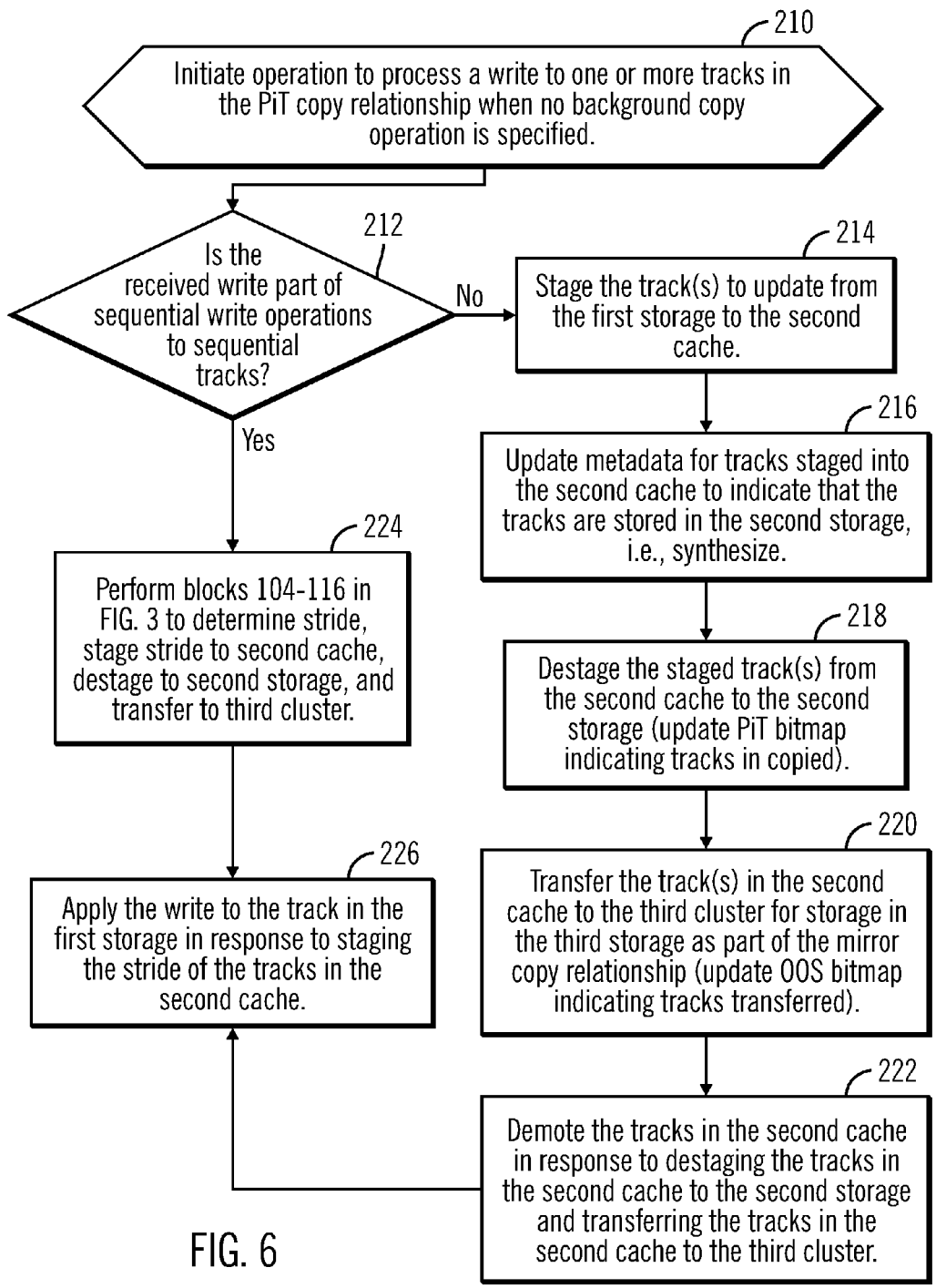
FIG. 6 illustrates an embodiment of operations to process a write to a track when no background copy operation is specified.

FIG. 6 illustrates an embodiment of operations by the scheduler 26 and the copy components, such as the PiT copy program 14, mirror copy program 20, and controllers 6a, 6b, 6c to replicate tracks among the sites 2a, 2b, 2c upon receiving a write to a track in a PiT copy relationship 16 when there is no background copy operation specified, such that only modified tracks are copied to the second storage 4b as part of the PiT copy relationship 16. Upon receiving the write (at block 210), the scheduler 26 (or other component) determines (at block 212) whether the write is part of sequential write operations to sequential tracks in the first storage 4a. This may be determined by analyzing metadata for the write or a pattern of writes in which the write is included. If (at block 212) the write is not part of sequential write operations, then the scheduler 26 schedules the PiT copy program 14 to stage (at block 214) the track(s) to update from the first storage 4a to the second cache 12b. The second controller 6b performs synthesis of the track in the second cache 12 by updating (at block 216) metadata for the track(s) staged into the second cache 12 to indicate that the track(s) is stored in the second storage 4b, such as change the track identifier, volume identifier, and storage identifier to that in the second storage 4b where the track will be destaged. The second controller 6b destages (at block 218) the staged track(s) from the second cache 12b to the second storage 4b. The PiT bitmap 18 is updated to indicate the tracks that were copied to the second cache 12b.

The scheduler 26 further schedules (at block 220) the transfer of the track(s) in the second cache 12b to the third cluster 2c for storage in the third storage 4c as part of the mirror copy relationship 20. Upon transferring the stride of tracks to the third cluster 3c, the OOS bitmap 24 is updated to indicate the track(s) that were transferred. In response to destaging the track(s) in the second cache 12b to the second storage 4b and transferring the track(s) in the second cache 12b to the third cluster 2c, the track(s) are indicated (at block 222) as eligible for demotion, which means they may be demoted in an accelerated fashion or demoted according to a Least Recently Used (LRU) cache management scheme.

If (at block 212) the write is part of sequential write operations, then the scheduler 26 and other components performs (at block 224) the operations at blocks 104-116 to determine a stride of track including the track to write, determine tasks to assign, schedule staging, destage, schedule the transfer, and demote the stride of tracks. After the track(s) are staged at blocks 220 or 224, the first controller 6*a* applies (at block 230) the write to the track in the first storage 4*b*.

The described embodiments provide techniques for optimizing the replication of tracks from a first storage to a second and third storages by staging the tracks to the second cache and then from the second cache, destaging the tracks to the second storage and transferring the tracks to the third cluster for storage in the third storage. Further, in certain situations, such as for a write when background copy is set or for a sequential write when there is no background copy, a stride of tracks including the track subject to the write may be staged from the first storage to the second cache so that when destaging to the second storage and transferring to the third storage a full stride write may occur, which optimizes the write operation to the RAID ranks including the tracks subject to the replication.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for copying data from a first storage to a second storage and a third storage, comprising:
   providing a point-in-time copy relationship to copy tracks as of a point-in-time in the first storage to a second storage;
   providing a mirror copy relationship to copy data in the second storage to the third storage;
   determining a track in the first storage to transfer to the second storage as part of the point-in-time copy relationship;
   determining a stride of tracks including a target track;
   staging the stride of tracks including the target track from the first storage to a cache according to the point-in-time copy relationship;
   destaging the staged stride from the cache to the second storage;
   transferring the stride in the cache to the third storage as part of the mirror copy relationship; and
   demoting the stride of tracks in the cache in response to destaging the stride of the tracks in the cache to the second storage and transferring the stride of tracks in the cache to the third storage.

2. The method of claim 1, wherein the cache comprises a first cache, wherein the stride comprises a set of tracks to stripe across a Redundant Array of Independent Disks (RAID) at the first, second and third storages, wherein the transferring the stride comprises transferring the stride of tracks to a second cache used to cache data for the third storage, further comprising:
   destaging the stride of tracks from the first cache to the second storage as a full stride write; and
   destaging the stride of tracks from the second cache to the third storage as a full stride write.

3. The method of claim 1, wherein the point-in-time copy relationship comprises a point-in-time copy relationship with a background copy operation to copy the tracks in the first storage to the second storage, wherein the determined track comprises one of the tracks copied as part of the background copy operation.

4. The method of claim 3, wherein the stride of tracks including the target track comprise a first stride of tracks, further comprising:
   receiving a write to a track that has not been copied to the second storage as part of the background copy operation;
   staging a second stride of tracks including the track subject to the write from the first storage to the cache as part of the point-in-time copy relationship;
   destaging the staged tracks of the second stride from the cache to the second storage;
   transferring the staged tracks of the second stride from the cache to the third storage;
   demoting the second stride of tracks in the cache in response to destaging the second stride of the tracks in the cache to the second storage and transferring the tracks from the second storage to the third storage; and
   applying the write to the track in the first storage in response to staging the second stride of the tracks in the cache.

5. The method of claim 3, wherein a first controller controls access to the first storage, wherein a second controller includes the cache and controls access to the second storage, and a third controller controls access to the third storage, and wherein the operations of scheduling the destaging and the transfer are performed by a scheduler, wherein the scheduler further performs:
   determining tasks to assign at the first and second controllers to perform the staging, destaging and the transfer.

6. The method of claim 5, wherein the determining of the tasks to assign comprises the scheduler performing:
   assigning at least a first number of tasks to each of at least one port of the second controller for the transfer of the stride of tracks to the third controller to store in the third storage as part of the mirror copy relationship;
   assigning no more than a second number of tasks to the first controller to read the stride of tracks from the first storage;
   assigning no more than the second number of tasks to the second controller to destage the stride of tracks from the cache to the second storage;
   assigning no more than a third number of tasks to first device adaptors used to access the first storage;

assigning no more than the third number of tasks to second device adaptors used to access the second storage.

7. The method of claim 1, further comprising:

receiving a write to a track in the first storage, wherein the determined target track comprises the track subject to the write;

determining if the received write is part of sequential write operations to sequential tracks, wherein the operation of staging, destaging, and transferring the stride are performed in response to determining that the received write is the part of sequential write operations; and applying the write to the target track in the first storage in response to staging the stride of tracks to the cache.

8. The method of claim 7, wherein in response to determining that the received write is not part of sequential write operations, further comprising:

staging the target track subject to the write from the first storage to the cache;

destaging the staged target track from the cache to the second storage;

transferring the staged target track from the cache to the third storage;

demoting the target track in the cache in response to destaging the stride of the tracks in the cache to the second storage and transferring the stride of tracks in the cache to the third storage and applying the write to the target track in the first storage in response to transferring the target track in the cache to the second storage and the third storage.

9. The method of claim 7, wherein the point-in-time copy relationship comprises a point-in-time copy relationship with no background copy operation to copy the tracks in the first storage to the second storage.

* * * * *